United States Patent [19]

Mousel

[11] Patent Number: 4,687,246

[45] Date of Patent: Aug. 18, 1987

[54] VEHICULAR SUNRAYS-BARRIER ASSEMBLY

[76] Inventor: Canellen K. Mousel, 801 Eleventh St., Arapahoe, Nebr. 68922

[21] Appl. No.: 919,987

[22] Filed: Oct. 17, 1986

[51] Int. Cl.[4] .............................................. B60J 3/00
[52] U.S. Cl. ................................. 296/97 G; 296/143; 160/238
[58] Field of Search ................ 296/140, 143; 160/238, 160/23 R

[56] References Cited

U.S. PATENT DOCUMENTS

| 1,623,934 | 4/1927 | Bourgon | 296/143 |
| 2,747,927 | 5/1956 | Burkhead | 296/97 G |
| 3,584,910 | 6/1971 | Lupul | 296/97 G |

FOREIGN PATENT DOCUMENTS 214538  4/1924  United Kingdom .

*Primary Examiner*—Robert R. Song

*Attorney, Agent, or Firm*—George R. Nimmer

[57] ABSTRACT

Mountably interposeable along the internal side of a transparent window pane is a sunrays-barrier assembly that shields a vehicular occupant from externally emanating sun rays. The sunrays-barrier assembly utilizes a conventional shade member having non-transparent sheeting convolutely wound around a roller having co-axial terminal pins. In addition to the conventional shade member, the sunrays-barrier assembly includes a bracket having a pair of longitudinally movably associated (but releasably arrestable) elongate bars respectively having inwardly extending terminal wings for removably receiving the shade member terminal pins. For removable attachment along the internalside of the vehicular window pane, the bracket includes at least two independently longitudinally movably and pivotably adjustable hooks that are specially adapted to removably mount the assembly to the encountered top-edge of a variable-elevational type vehicular window pane.

11 Claims, 5 Drawing Figures

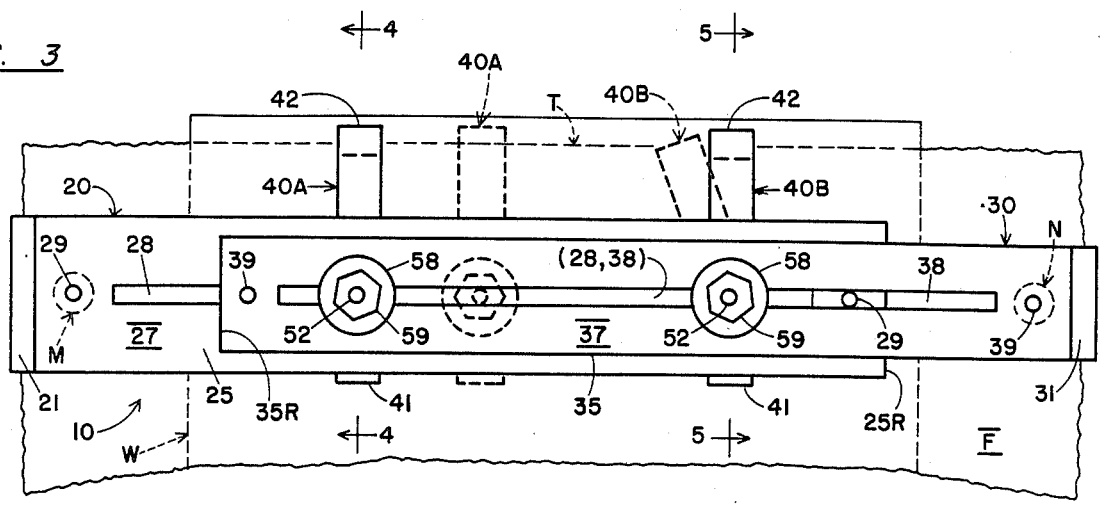
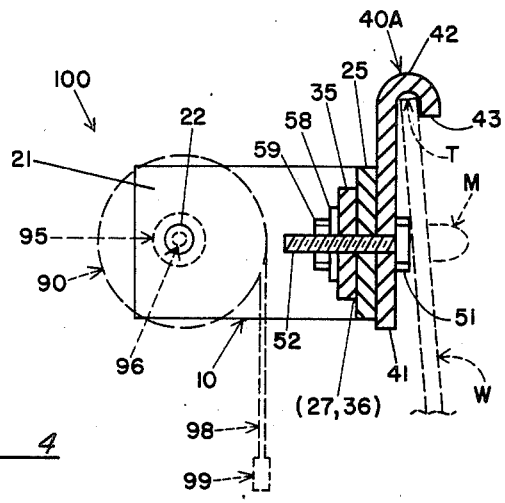
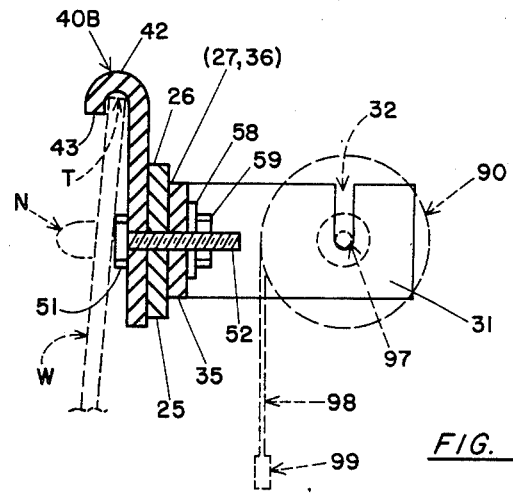
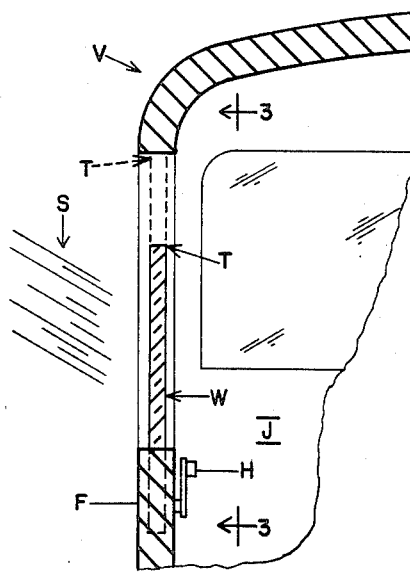

VEHICULAR SUNRAYS-BARRIER ASSEMBLY

BACKGROUND OF THE INVENTION

Drawing FIG. 1 is a schematic sectional elevational view of a representative roadway vehicle "V" conventionally equipped with at least one sideward transparent window pane "W" that permits the transmission of external sun rays "S" into the vehicle occupiable interior "J". The window pane framework "F" is typically internally equipped with mechanism (e.g. at handle "H") for effecting a variable-elevation for the longitudinally extending top-edge "T" of window pane "W".

Drawing FIG. 2 is a perspective view of a conventional shade member 90 comprising a roller means 95 having co-axial terminal pins 96 and 97 and possibly internal springs (not shown) and together with non-transparent (and preferably substantially opaque) flexible sheeting 98 convolutely wound around roller means 95. 99 indicates that the free-edge of sheeting 98 might be provided with a manual pull (99).

Numerous prior art teaches the general concept of interposing a sunrays-barrier alongside a vehicular transparent window pane, thereby shielding the internal occupants from bothersome sun rays. Among the numerous prior art are U.S. Pat. Nos. 603,512; 1,623,934; etc. However, most relevant prior art necessitates the usage of shade members having an expense and complexity far exceeding that for the conventional convolute type shade member. Also, sunrays-barriers of the prior art need to be specifically custom fabricated for specific vehicular models and/or require complicated and expensive modification to the surrounding window framework of the specifically encountered vehicular model.

OBJECT OF THE INVENTION

In view of the foregoing, it is the general objective of the present invention to provide an improved sunrays-barrier assembly that is readily mountably interposeable internally of a vehicular window pane, whereby vehicle internal occupants might be shielded from bothersome sun rays. Ancillary general objectives include the provision of an apt sunrays-barrier assembly: that might utilize a conventional convolutely wound sheeting type shade member; that is longitudinally adjustable according to the longitudinal lengthwise extent of the vehicular window pane; that is removably attachable along various top-edge contours for a vehicular window; that also might be augmentably anchorable to the vehicular window framework; and that is of economical fabrication and long lasting, including the ability to adjustably adapt to other vehicular environments.

GENERAL STATEMENT OF THE INVENTION

With the aforestated general objectives in view, and together with other related and specific objectives which will become apparent as this description proceeds, the vehicular sunrays-barrier assembly concept of the present invention generally comprises: a bracket comprising a pair of longitudinally movably associated and releasably arrestable elongate bars that are respectively terminally provided with transversely inwardly forwardly extending wings whereby the two bracket wings are adapted to securely removably receive the co-axial terminal pins of a conventional convolutely wound sheeting type shade member; at least two transversely outwardly readwardly extending hooks, each hook independently having longitudinally movable and pivotal adjustability along the dual-bars bracket, whereby these two hooks are adapted to removably conformably engage the specifically contoured top-edge of a vehicular window pane; and together with specific ancillary related structural features and including, inter alia, means for optionally anchoring the window suspended assembly to the surrounding framework.

BRIEF DESCRIPTION OF THE DRAWING

In the drawing, wherein like characters refer to like parts in the several views, and in which:

Drawing FIG. 1, aforedescribed, is a schematic sectional elevational view of a representative roadway vehicular environment for the sunrays-barrier assembly concept of the present invention;

FIG. 2, aforedescribed, is a perspective view of a conventional convolutely wound sheeting type shade member which forms a component of the sunrays-barrier assembly concept of the present invention;

FIG. 3 is a longitudinally extending frontal elevational view of a representative embodiment 100 of the vehicular sunrays-barrier of the present invention, such as seen along line 3—3 of FIG. 1;

FIG. 4 is a sectional elevational view taken along line 4—4 of FIG. 3; and

FIG. 5 is a sectional elevational view taken along line 5—5 of FIG. 3.

DETAILED DESCRIPTION OF THE DRAWING

In addition to the conventional convolutely wound sheeting type shade means (90), the vehicular sunrays-barrier assembly embodiment 100 comprises a bracket 10. Bracket 10 comprises two longitudinally movably associated elongate bars (20, 30), respective terminii being provided with transversely inwardly forwardly extending wings (21, 31). One wing is centrally apertured (22) and the other wing is downwardly notched (32), whereby the bracket wings are adapted to removably receiveably support the shade means terminal pins (96, 97).

For the two longitudinally movable associated bracket bars, one might, for example, be denominated as a rearward first-bar 20 including a longitudinally extending and preponderant first-length 25 having an upright terminus 25R remote from the first-bar lead-wing 21. First-bar 20, having uprightly and longitudinally extending parallel planar surfaces 26 and 27, is provided with a longitudinally centrally slotted portion 28. Such slotted first-length 25 is optionally provideable with perforations 29 flanking slotted length 28. Analagously, the other bracket bar might be denominated as a forward second-bar 30 including a longitudinally extending and predominate second-length 35 having an upright terminus 35R remote from second-bar trail-wing 32. Second-length 35, having uprightly and longitudinally extending planar surfaces 36 and 37, is provided with a longitudinally centrally slotted portion 38 and is optionally provideable with perforations 39 flanking slotted length 38. Both bars are singularly constructed throughout, such as by providing a single wing-like bend (21, 31) at the terminus of a single rectangular length of metallic strapping. The two bars are flatly superimposed, such as by abutting second-bar rearward face 36 against first-bar forward face 27 and aligning the respective slotted portions (28, 38). There are arresting means for releasably maintaining arbitrarily selected longitudinal inter-relationships between the two bracket bars. Such arresting means might, for example, comprise a fastener means including a headed shank (52) extending transversely through and loosely surrounded by the bars slotted portions (28, 38) and which shank is threadedly engaged with a fastener nut member (59) that is abuttable against the second-bar forward face (37) through an intervening washer (58).

In addition to the longitudinally adjustable dual-bars portion (20, 30), the sunrays-barrier assembly bracket (e.g. 10) comprises at least two transversely outwardly rearwardly extending hooks (e.g. 40A, 40B) that are independently pivotably associated with at least one of the bracket bars. Moreover, at least one, and preferably two, such hooks is longitudinally adjustably positionable along the bracket. Accordingly, the at least two hooks are together adapted to removably attach the sunrays-barrier assembly (e.g. 100) to the longitudinally horizontally extending top-edge contour "T" of a variable-elevational vehicular window pane "W". In this regard, each hook is preferably of linearly generated configuration (e.g. bent from a single piece of flat metal). Each such hook: has the non-hooked lower-end 41 located below the bracket dual-bars portion; has a curved base 42 located above the bracket dual-bars portion; and has a free-end 43 located somewhat below curved base 42. The longitudinally adjustable and pivotal conditions for hooks 40 (indicated in FIG. 3 phantom line) might be provided by having the hooks loosely surrounding the aforementioned threaded shanks 52 and wherein the heads 51 therefor abut first-bar rearward face 26. Accordingly, manipulation of the aforementioned nut and washer (58, 59) permits independent longitudinal adjustability and pivoting of the respective hooks.

"M" and "N" refer to nails, or other similar auxiliary fasteners, which might be optionally employed for extension through selected perforations (29, 39) and thereby possibly augmentably anchoring the assembly to the surrounding vehicular framework for window-"W".

From the foregoing, the construction and operation of the vehicular sunrays-barrier assembly concept will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. Vehicular sunrays-barrier assembly interposeable between the external sun and an internal occupant of a windowed roadway vehicle having a variable-elevational, longitudinally extending, top-edge for a said transparent window pane, said barrier assembly being locateable substantially parallel to and immediately adjacent to a said window pane top-edge and being removably attachable thereat, and said vehicular sunrays-barrier assembly comprising:

(A) a non-transparent flexible shade convolutely wound around a longitudinally extending roller means having co-axial terminal pins characterized as a lead-pin and a trail-pin; and (B) a bracket comprising a pair of relatively longitudinally movably associated bars including a first-bar and a second-bar, said bars being respectively provided with a transversely inwardly extending wing, one of said wings wholly surrounding a centrally apertured portion thereof to directionally longitudinally receive one terminal pin of a said roller means, another of said wings being provided with a downwardly notched portion to directionally downwardly receive the other terminal pin of a said roller means;

(i) said first-bar including a longitudinally extending first-length and also one of said wings, characterized as a leadwing, and (ii) said second-bar including a longitudinally extending second-length in longitudinally movable relationship to said firstlength, and said second-bar also including the other of said wings, characterized as a trail-wing; arresting means for releasably maintaining some arbitrarily selected longitudinal inter-relationship between said bars; and at least two transversely outwardly extending hooks pivotably associated with at least one of said bars, and at least one of said hooks having a longitudinally adjustable condition along at least one of said bars, whereby said hooks are together adapted to removably attach said sunrays-bracket assembly to said longitudinally extending top-edge of some arbitrarily peripherally defined vehicular window pane.

2. The vehicular sunrays-barrier assembly of claim 1 wherein the arresting means comprises at least one headed fastener having a threaded shank extending transversely through and being longitudinally slidable along longitudinally extending slotted portions for said first-length and for said second-length, said threaded shank being threadedly engaged with a nut member that is transversely bearable against one of said longitudinally movably associated bars.

3. The assembly of claim 2 wherein at least one of said hooks is pivotably associated with a said headed fastener.

4. The assembly of claim 3 wherein there are two such headed fasteners and two said respectively pivotably associated hooks.

5. The assembly of claim 4 wherein each said bar is of L-shaped configuration.

6. The vehicular sunrays-barrier assembly of claim 1 wherein each said bar is singularly constructed of the same structural material including a preponderant longitudinally extending length and a transversely inward wing terminal portion.

7. The assembly of claim 6 wherein each said bar is singularly constructed of a single rectangular length of metallic strapping provided with a single permanent bend at the wing terminal portion.

8. The assembly of claim 7 wherein the arresting means comprises at least two headed fasteners respectively having a threaded shank passing transversely through and being slidable along longitudinally slotted portions of said first-length and second-length, said threaded shanks being respectively threadedly engaged with a nut member that is transversely bearable against a longitudinally movably associated bar; and wherein the first-length and also the second-length are respectively provided with transversely extending perforations flanking said longitudinally extending slotted portion, whereby said flanking perforations might be positioned longitudinally beyond a window pane and there surround one or more auxiliary fasteners.

9. The vehicular sunrays-barrier assembly of claim 8 wherein each said bar is singularly constructed of a single rectangular length of metallic strapping provided with a single permanent bend at the wing terminal portion; and wherein the first-length and second-length are respectively provided with transversely extending perforations flanking the longitudinally extending slotted portion thereof, and said first-length and second-length having uprightly and longitudinally extending parallel planar surfaces.

10. Vehicular sunrays-barrier assembly interposeable between the external sun and an internal occupant of a windowed roadway vehicle having a variable-elevational, longitudinally extending, top-edge for a said transparent window pane, said vehicular sunrays-barrier being removably attachable to said window pane and comprising:
- (A) a non-transparent flexible shade convolutely wound around a longitudinally extending roller means having co-axial terminal pins; and
- (B) a bracket comprising a pair of relatively longitudinally movably associated bars including a first-bar and a second-bar, said first-bar being singularly constructed of L-shaped structural material including a preponderant longitudinally extending and longitudinally slotted first-length for the bracket and also including a centrally apertured lead-wing extending transversely inwardly of said first-length, said second-bar being singularly constructed of L-shaped structural material including a preponderant longitudinally extending and longitudinally slotted second-length for the bracket and also including a downwardly notched trail-wing extending transversely inwardly of said second-length, at least two headed fasteners respectively having a threaded shank passing transversely through and being slidably movable along said slotted first-length and second-length, each said threaded shank being threadedly engaged with a nut means that is transversely bearable against a said movably associated elongate bar, and at least two linearly generated hooks that are respectively pivotably associated with a said headed fastener.

11. In removable combination with a roadway vehicle having a variable-elevational transparent window including a longitudinally extending top-edge, a sunrays-barrier assembly located within the vehicular occupant compartment at said window and comprising:
- (A) a non-transparent flexible shade convolutely wound around a longitudinally extending roller means having co-axial terminal pins; and
- (B) a longitudinally extending bracket having a pair of longitudinally separated and transversely inwardly extending wings respectively removably engaged with said roller means terminal pins, said wings including a centrally apertured lead-wing and a downwardly notched trail-wing, and at least one linearly generated and transversely outwardly extending hook, said at least one hook being pivotably attached along a transversely extending hook-axis located between said inwardly extending wings and above said hook-axis being removably engaged with said vehicular window at the variable-elevational top-edge thereof.

* * * * *